(12) United States Patent
Sato

(10) Patent No.: US 6,408,012 B1
(45) Date of Patent: Jun. 18, 2002

(54) SIGNAL PROCESSING CIRCUIT

(75) Inventor: Sadaharu Sato, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/132,823

(22) Filed: Aug. 12, 1998

(30) Foreign Application Priority Data

Aug. 14, 1997 (JP) .............................. 9-219622

(51) Int. Cl.[7] .............................. H04J 3/22; H04J 3/06; H04J 3/24; H04L 12/66; G06F 13/00

(52) U.S. Cl. ...................... 370/545; 370/463; 370/509; 370/473; 710/130

(58) Field of Search .................. 370/463, 516, 370/509, 489, 545, 389, 522–253, 257, 421, 473–474; 710/33, 126, 129, 130; 714/746; 375/371; 725/74; 348/497, 518

(56) References Cited

U.S. PATENT DOCUMENTS

| | | | | |
|---|---|---|---|---|
| 5,710,649 A | * | 1/1998 | Mollenauer | 375/371 |
| 6,018,816 A | * | 1/2000 | Tateyama | 714/746 |
| 6,172,989 B1 | * | 1/2001 | Yanagihara et al. | 370/473 |
| 6,259,694 B1 | * | 6/2001 | Sato et al. | 370/389 |

* cited by examiner

Primary Examiner—Wellington Chin
Assistant Examiner—Maikhanh Tran
(74) Attorney, Agent, or Firm—Ronalk P. Kananen, Esq.; Rader, Fishman & Grauer, LLP

(57) ABSTRACT

A signal processing circuit which can effectively use a serial interface bus, provided with transmission processing circuits and a link core for dividing or synthesizing an input transport stream packet based on a number of divided blocks or a number of synthesized packets set in advance in accordance with the input rate, adding a time stamp which suppresses jitter at the serial interface bus and determines the output time of the data at the reception side, and sends the same to the serial interface bus.

12 Claims, 13 Drawing Sheets

FIG.2

IN THE DVB METHOD

| NOSP VALUE | NODB VALUE | NUMBER OF TRANSMITTING DATA | TRANSMITTABLE DATA RATE |
|---|---|---|---|
| 0000 | 001 | 1 DATA BLOCK | 1.5Mbps |
| 0000 | 010 | 2 DATA BLOCK | 3.0Mbps |
| 0000 | 100 | 4 DATA BLOCK | 6.0Mbps |
| 0001 | 000 | 1 SOURCE PACKET | 12.0Mbps |
| 0010 | 000 | 2 SOURCE PACKET | 24.0Mbps |
| 0011 | 000 | 3 SOURCE PACKET | 36.0Mbps |
| 0100 | 000 | 4 SOURCE PACKET | 48.1Mbps |
| 0101 | 000 | 5 SOURCE PACKET | 60.1Mbps |

FIG.3

IN THE DSS METHOD

| NOSP VALUE | NODB VALUE | NUMBER OF TRANSMITTING DATA | TRANSMITTABLE DATA RATE | |
|---|---|---|---|---|
| | | | AddSize=Ah | AddSize=Ah |
| 0000 | 001 | 1 DATA BLOCK | 2.0Mbps | 2.2Mbps |
| 0000 | 010 | 2 DATA BLOCK | 4.1Mbps | 4.4Mbps |
| 0001 | 000 | 1 SOURCE PACKET | 8.3Mbps | 8.9Mbps |
| 0010 | 000 | 2 SOURCE PACKET | 16.6Mbps | 17.9Mbps |
| 0011 | 000 | 3 SOURCE PACKET | 24.9Mbps | 26.8Mbps |
| 0100 | 000 | 4 SOURCE PACKET | 33.2Mbps | 35.8Mbps |
| 0101 | 000 | 5 SOURCE PACKET | 41.6Mbps | 44.8Mbps |
| 0110 | 000 | 6 SOURCE PACKET | 49.9Mbps | 53.7Mbps |

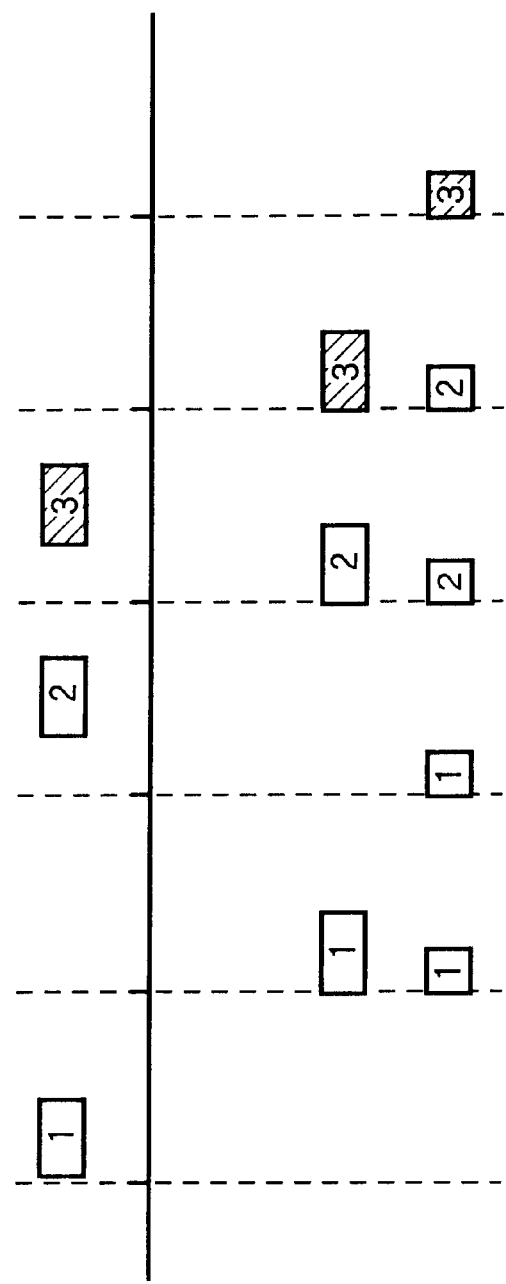

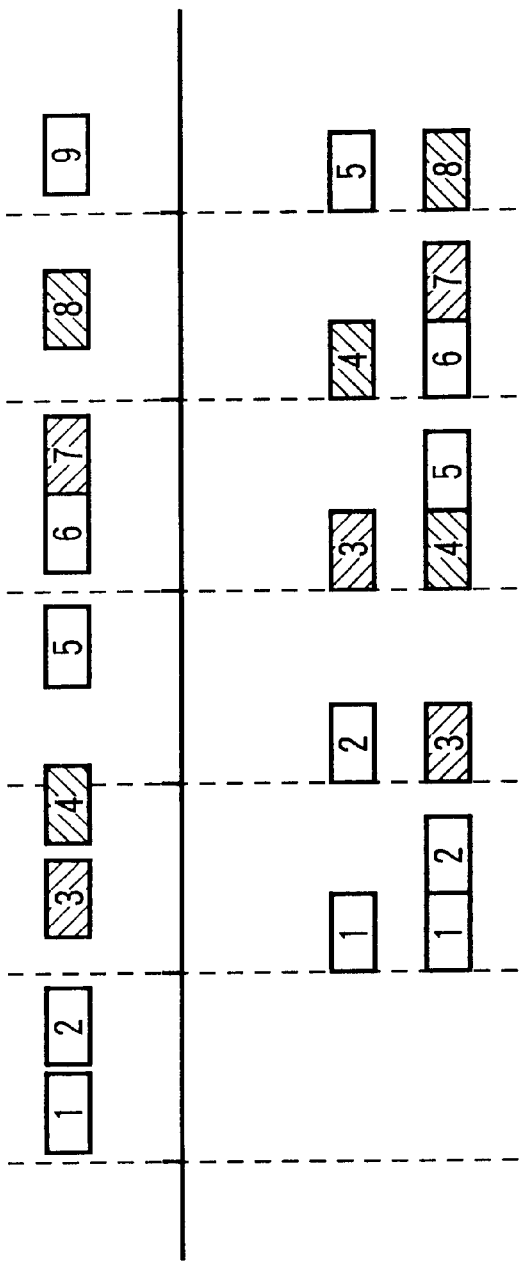

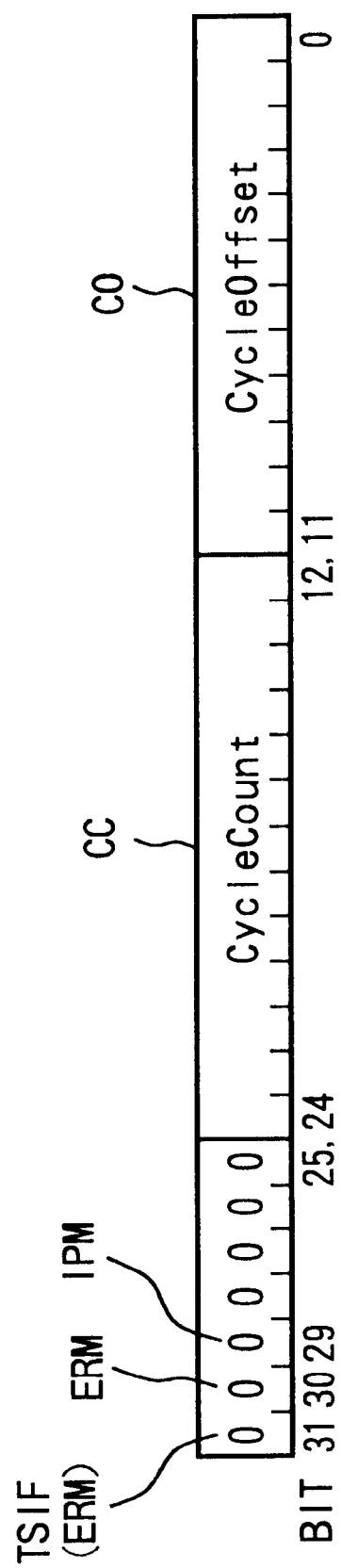

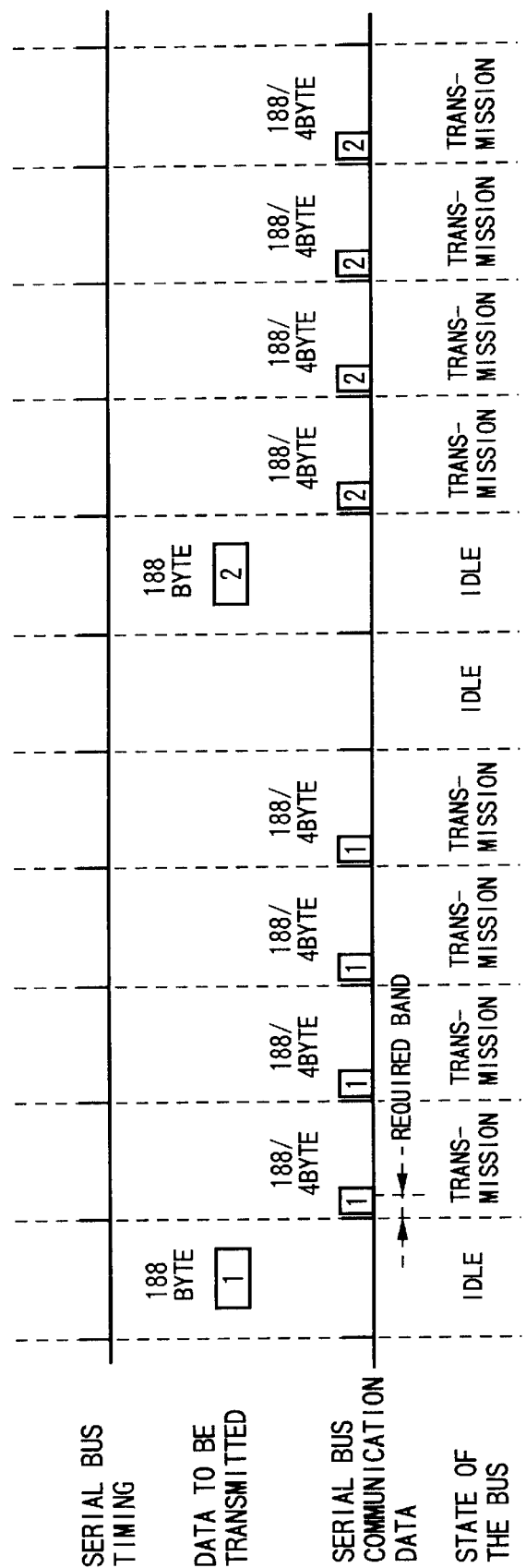

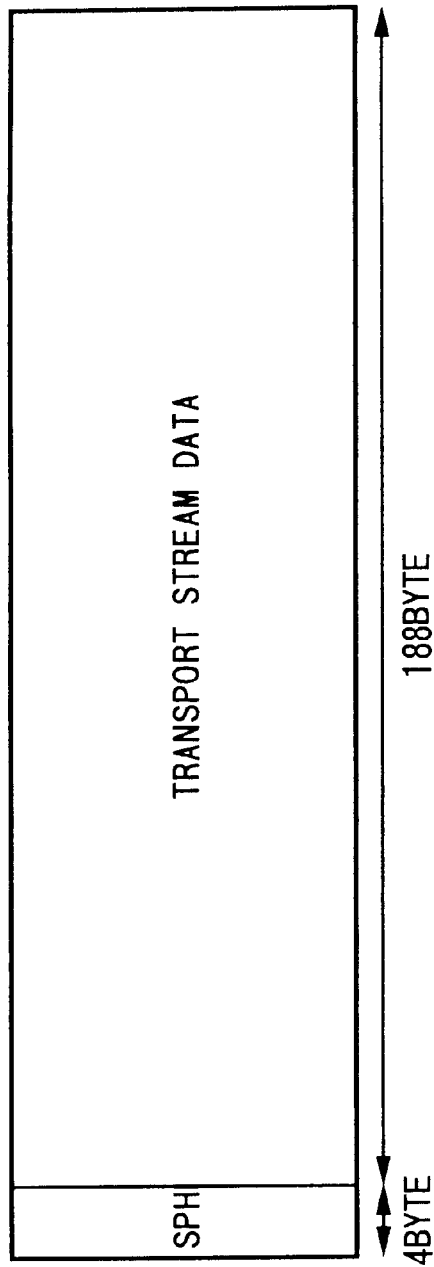
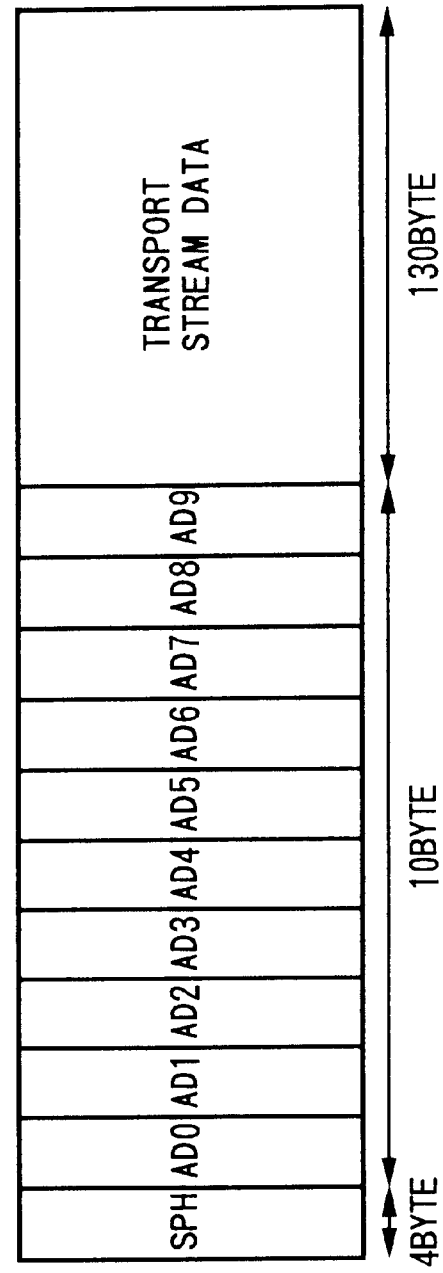

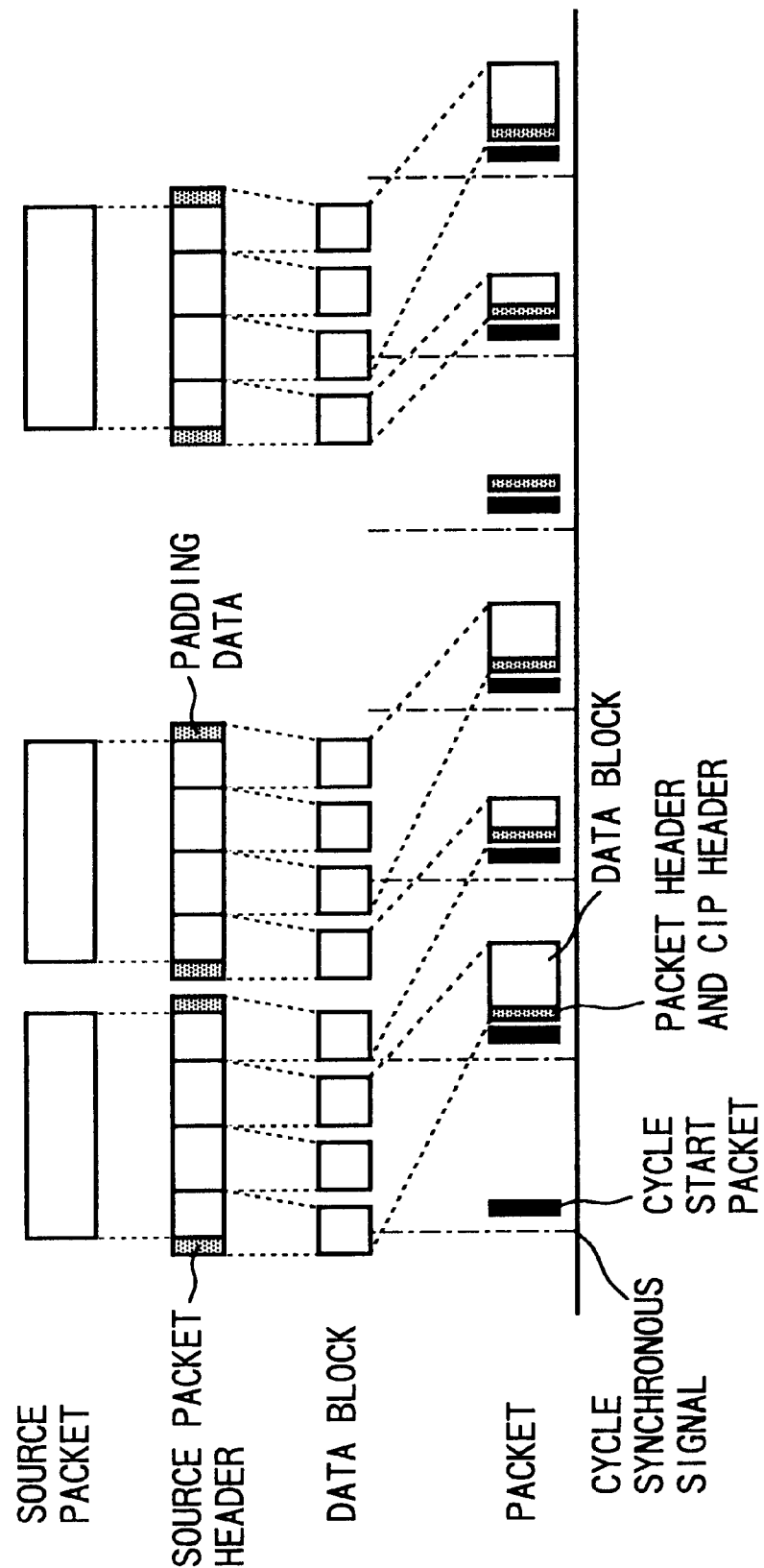

SIGNAL PROCESSING CIRCUIT

BACKGROUND OF THE INVENTION

1. Field of the Invention

The present invention relates to a signal processing circuit used in a digital serial interface.

2. Description of the Related Art

In recent years, the IEEE (Institute of Electrical and Electronic Engineers) 1394 high performance serial bus for realizing high speed data transfer and real time transfer has become the standard for interfaces for transfer of multimedia data.

The data transfer of this IEEE 1394 serial interface includes the asynchronous transfer for requests, requests for acknowledgment, and acknowledgment of reception of the related art and isochronous transfer with which the data is sent at one time from a certain node at 125 μs.

Data is transferred in units of packets using an IEEE 1394 serial interface having such two transfer modes.

FIGS. 8A and 8B are views of the byte size of a source packet in isochronous communication. FIG. 8A shows the size of a packet in digital video broadcast (DVB) specifications, while FIG. 8B shows the size of a packet in digital satellite system (DSS) specification.

A source packet in the DVB specification is comprised of 192 bytes, that is, 4 bytes of a source packet header (SPH) and 188 bytes of inherent transport stream data (TSD), as shown in FIG. 8A.

Contrary to this, the source packet in the DSS specification is comprised of 144 bytes, that is, 4 bytes of a source packet header (SPH), 10 bytes of additional data (AD0 to AD9), and 130 bytes of inherent transport stream data (TSD).

The additional bytes are inserted between the source packet header and the data. Note that, in the IEEE 1394 standard, the unit of minimum data able to be handled is one quadlet (=4 bytes=32 bits), therefore the total of the transport stream data and the additional data must be comprised of 32-bit units.

At the default, however, no additional byte is set.

FIG. 9 is a view of an example of the correspondence between the original data and the packets actually transmitted when data is transmitted in the isochronous communication of the IEEE 1394 standard.

As shown in FIG. 9, each of the source packets of the original data is given a source packet header of 4 bytes and padding data for adjusting the data length and then is divided into a predetermined number of data blocks.

Note that since the unit of data when transferring a packet is one quadlet (4 bytes), the byte lengths of the data blocks, various headers, etc. are all set to multiples of 4.

FIG. 10 is a view of the format of the source packet header.

As shown in FIG. 10, a time stamp utilized for suppressing Jitter when for example MPEG (Moving Picture Experts Group)-TS (Transport Stream) data utilized in a digital satellite broadcast etc. of the above DVB specificatoin is transmitted by isochronous communication is written in 25 bits in the source packet header.

Such a packet header, a common isochronous packet (CIP) header, and other data is added to a predetermined number of data blocks so as to produce a final packet.

FIG. 11 is a view of an example of the basic configuration of an isochronous communication use packet.

As shown in FIG. 11, in a packet for isochronous communication, the first quadlet is comprised of a 1394 header, the second quadlet a Header-CRC, the third quadlet a CIP-header 1, the fourth quadlet a CIP-header 2, the fifth quadlet a source packet header (SPH), and the sixth quadlet and on a Data-CRC.

The 1394 header is comprised by a "data-length" representing the data length, a "channel" indicating the number of the channel (one of 0 to 63) over which this packet is to be transferred, a "tcode" representing a processing code, and a synchronous code "sy" prescribed by each application.

The Header-CRC is an error detection code of the packet header.

The CIP-header 1 is comprised by a source node ID (SID) region for the number of the transmission node, a data block size (DBS) region for the length of the data block, a fraction number (FN) region for the number of divisions of the data in the formation of the packet, a quadlet padding count (QPC) region for the number of the quadlets of the padding data, a source packet header (SPH) region for the flag showing the existence of the source packet header, and a data block continuity counter (DBC) region for the counter for detecting the number of isochronous packets.

Note that the DBS region shows the number of the quadlets transferred through one isochronous packet.

The CIP-header 2 is comprised by an FMT region for the signal format showing the type of the data to be transferred and a format dependent field (FDF) region utilized corresponding to the signal format.

The SPH header has a time stamp region in which is set a value for giving a fixed delay in the order of arrival of the transport stream packet.

Further, the data CRC is the error detection code of the data field.

A signal processing circuit of an IEEE 1394 serial interface for the transmission and reception of packets having the above configuration is mainly constituted by a physical layer circuit for directly driving the IEEE 1394 serial bus and a link layer circuit for controlling the data transfer of the physical layer circuit.

In the isochronous communication system in the IEEE 1394 serial interface, as shown in for example FIG. 12, the link layer circuit 2 is connected to an application, that is, MPEG transporter 1, while the link layer circuit 2 is connected to a serial interface bus BS via a physical layer circuit 3.

In the transfer of data of the IEEE 1394 serial interface, the transmission data and reception data are stored once in a storage device such as a first-in first-out (FIFO) memory (hereinafter simply referred to as an FIFO) provided in the link layer circuit 2. In actuality, an asynchronous packet use FIFO and an isochronous packet use FIFO are separately provided.

As explained above, one source packet of transport stream data of an ordinary MPEG is sometimes divided for transmission.

However, in the present signal processing circuit of IEEE 1394 serial interface circuit, there is no processing system for dividing one source packet or combining several source packets for transmission.

For example in the present system, as shown in FIG. 13, a data is transmitted when there is data to be transferred. When there is no data to be transmitted, the transmission side is in an idle state with respect to the serial bus.

However, even when the transmission side is in an idle state, the transmission systems of other nodes cannot use the bus since it is necessary to secure the bandwidth for maximum peak time.

SUMMARY OF THE INVENTION

An object of the present invention is to provide a signal processing circuit which can efficiently use a serial interface bus.

According to a first aspect of the present invention, there is provided a signal processing circuit for performing transmission between its own node and another node connected to its own node via a serial interface bus, comprising a data processing circuit for dividing an input stream packet based on a predetermined number of divided blocks set in accordance with an input rate for output.

According to a second aspect of the present invention, there is provided a signal processing circuit for performing transmission between its own node and another node connected to its own node via a serial interface bus, comprising a data processing circuit for combining input stream packets based on a predetermined number of synthesized packets set in accordancw with an input rate for output.

According to a third aspect of the present invention, there is provided a signal processing circuit for performing transmission between its own node and another node connected to its own node via a serial interface bus, comprising a data processing circuit for dividing or synthesizing an input stream packet based on a predetermined number of divided blocks or number of synthesized packets set in accordance with an input rate for output.

According to the present invention, for example in the case of transmitting a transport stream packet in the data processing circuit, the transport stream packet to be input is divided or packets are combined based on a number of divided blocks or number of synthesized packets set in advance in response to an input rate and transferred to the serial interface bus.

This number of divided blocks or number of synthesized packets is set in accordance with the peak rate of the stream.

Also, each packet to be transferred to the serial interface bus is given a time stamp for suppressing jitter at the serial interface and determining the data output time at the reception side.

BRIEF DESCRIPTION OF THE DRAWINGS

These and other objects and features of the present invention will become clearer from the following description of the preferred embodiments given with reference to the accompanying drawings, in which:

FIG. 2 is a view of the correspondence among the data rate of transmittable transport stream data, the number of divided blocks set in an NODB register, the number of synthesized packets set in an NOSP register, and the number of transmitted data (number of blocks or packets) in the DVB specification;

FIG. 3 is a view of the correspondence among the data rate of transmittable transport stream data, the number of divided blocks set in the NODB register, the number of synthesized packets set in the NOSP register, and the number of transmitted data (number of blocks or packets) in the DSS specification;

FIG. 4 is a view of an example of modes of transfer at a bus in the case of a low rate when transmitting transport stream data without dividing packets and when dividing packets into two and transmitting the data in ½ packets;

FIG. 5 is a view of an example of modes of transfer at a bus in the case of a high rate when transmitting transport stream data without combining packets and when combining two packets and transmitting the data by double packets;

FIG. 6 is a view for explaining the concrete configuration of a time stamp;

FIG. 7 is a view of an example of modes of transfer at a bus in the case of a low rate when dividing packets into four and transmitting transport stream data in ¼ packets;

FIGS. 8A and 8B are views of a byte size of a source packet in isochronous communication, in which FIG. 8A is a view of the packet size in the DVB specification and FIG. 8B is a view of the packet size in the DSS specification;

FIG. 9 is a view of an example of the correspondence between original data and packets actually transmitted when data is transmitted through isochronous communication of the IEEE 1394 standard;

DESCRIPTION OF THE PREFERRED EMBODIMENTS

Below, a preferred embodiment will be described with reference to the accompanying drawings.

Figure 1:
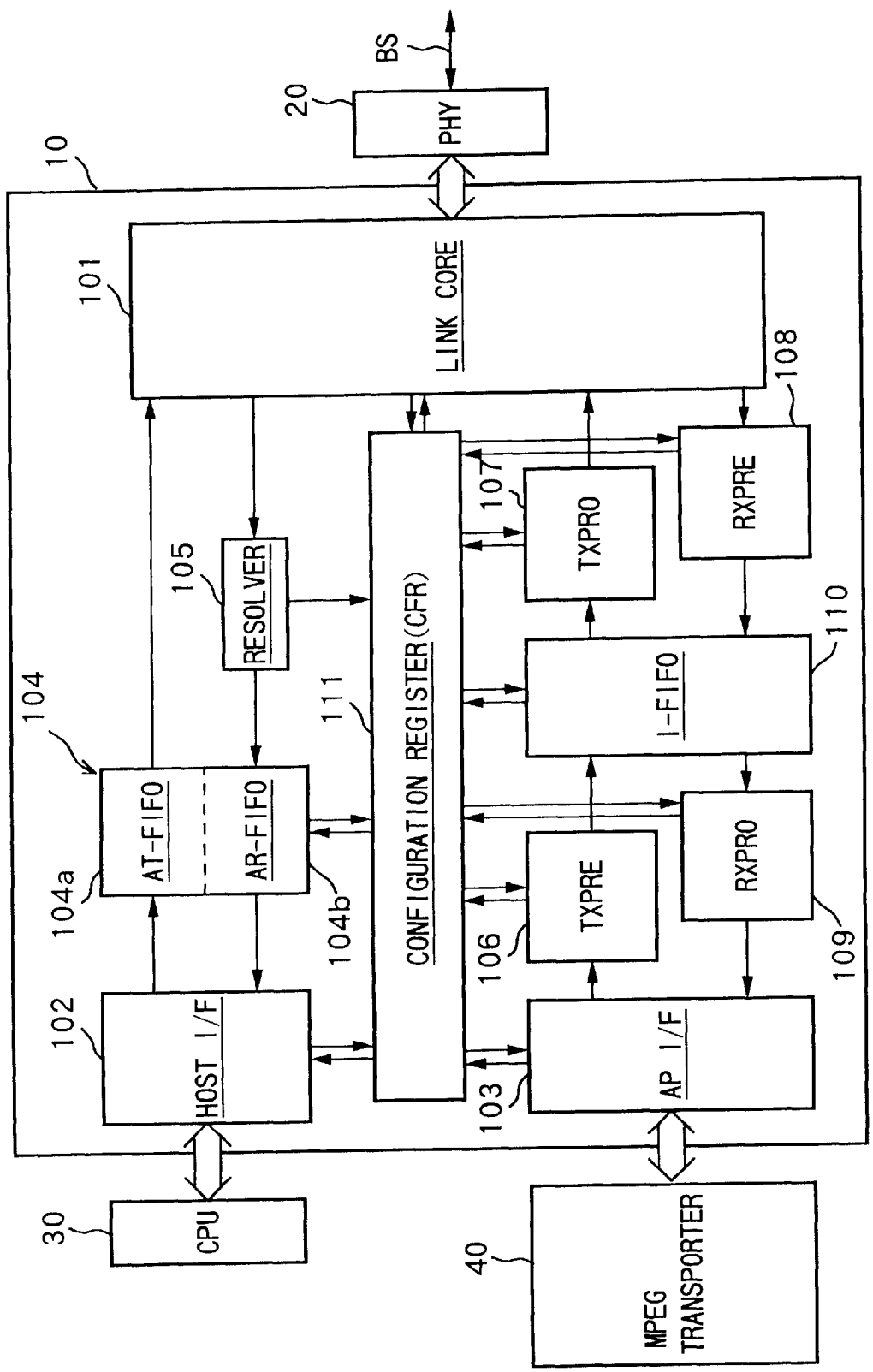
FIG. 1 is a block diagram of the configuration of an MPEG use signal processing circuit according to the present invention applied to an IEEE 1394 serial interface.
Figure 10:
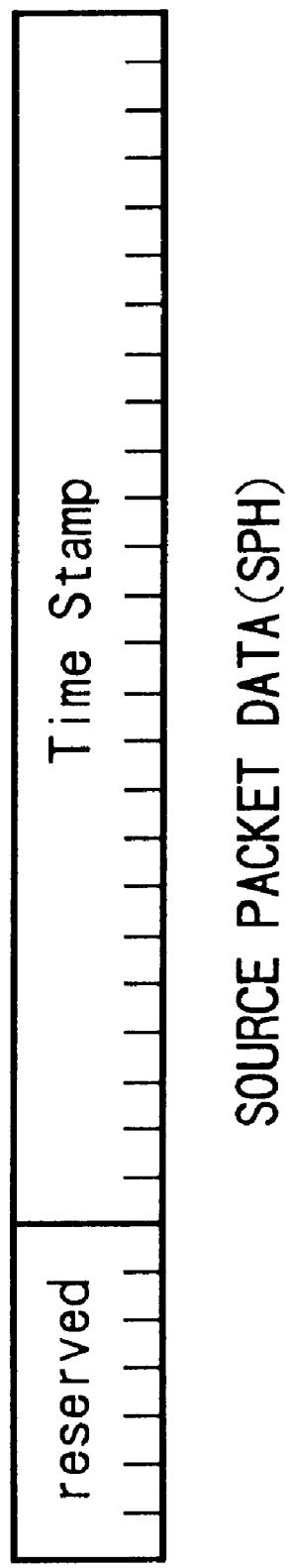
FIG. 10 is a view of the format of a source packet header.

FIG. 1 is a block diagram of the configuration of an MPEG use signal processing circuit according to the present invention applied to an IEEE 1394 serial interface.

This signal processing circuit is constituted by a link layer circuit 10, a physical layer circuit 20, and a central processing unit (CPU) 30 serving as a host computer. Further, 40 denotes an MPEG transporter.

The link layer circuit 10 controls asynchronous transfer and isochronous transfer and controls the physical layer circuit 20 under the control of the CPU 30.

More specifically, as shown in FIG. 1, the circuit is constituted by a link core 101, a host interface circuit (Host I/F) 102, an application interface circuit (AP I/F) 103, an asynchronous communication use FIFO 104 comprising a transmission use FIFO (AT-FIFO) 104a and a reception use FIFO (AR-FIFO) 104b, a self ID use resolver 105, an isochronous communication use pre-transmission processing circuit (TXPRE) 106, an isochronous communication use post-transmission processing circuit (TXPRO) 107, an isochronous communication use pre-reception processing circuit (RXPRE) 108, an isochronous communication use post-reception processing circuit (RXPRO) 109, an isochronous communication use FIFO (I-FIFO) 110, and a configuration register (hereinafter simply referred to as a CFR) 111.

In the circuit of FIG. 1, an asynchronous communication system circuit is costituted by the host interface circuit 102, the transmission use FIFO 104a, and the reception use FIFO 104b for asynchronous communication and the link core 101.

An isochronous communication system circuit is constituted by the application interface circuit 103, the pre-transmission processing circuit 106, the post-transmission processing circuit 107, the pre-reception processing circuit 108, the post-reception processing circuit 109, the FIFO 110, and the link core 101.

The link core 101 is constituted by a transmission circuit of an asynchronous communication use packet and an isochronous communication use packet, a reception circuit, an interface circuit with the physical layer circuit 20 for directly driving the IEEE 1394 serial bus BS of these packets, a cycle timer reset at every 125 μs, a cycle monitor, and a CRC circuit. The time data etc. of the cycle timer for example are supplied to the isochronous communication system processing circuit through the CFR 111.

The host interface circuit 102 mainly performs interfacing of writing, reading, etc. of the asynchronous communication use packet with the CPU 30 serving as the host computer and the transmission use FIFO 104a and reception use FIFO 104b and interfacing of the transmission and reception of various data with the CPU 30 and CFR 111.

For example, the time stamp use delay time Txdelay set in the source packet header (SPH) of the isochronous communication use packet is set from the CPU 30 into the CFR 111 through the host interface 102.

Further, the number of divided blocks or the number of synthesized packets set in accordance with the peak rate of the stream in advance in order to transmit the divided or synthesized transport stream packet to be input as an isochronous packet in accordance with the input rate is set from the CPU 30 through the host interface circuit 102 into the CFR 111.

More specifically, the number of divided blocks is set into the NODB register of the CFR 111 and the number of synthesized packets is set into the NOSP register.

FIG. 2 is a view of the correspondence among the data rate of transmittable transport stream data, the number of divided blocks set in the NODB register, the number of synthesized packets set in the NOSP register, and the number of transmitted data (number of blocks or packets) in the DVB specification.

FIG. 3 is a view of the correspondence among the data rate of transmittable transport stream data, the number of divided blocks set in the NODB register, the number of synthesized packets set in the NOSP register, and the number of transmitted data (number of blocks or packets) in the DSS specification.

The number of divided blocks is set in the NODB register in accordance with the rate of the NODB register when the input rate of the transport stream packet to be input is low, such as 1.5 Mbps to 6.0 Mbps, and the number of synthesized packets is set into the NOSP register in accordance with the rate when the input rate of the transport stream packet to be input is high, such as more than 16.6 Mbps.

Note that the smallest size which a packet can be divided into is one data block.

One data block is comprised of 24 bytes in the DVB specification, consequently one packet can be divided into 1/8 for transmission.

Also, the biggest size of a packet able to be composed is for example 15 packets. It is possible, however, to combine and transmit all of the packets stored in the FIFO 110 when the packets which can be transmitted in the cycle is less than the number of synthesized packets.

FIG. 4 is a view of an example of modes of transfer at a bus in the case of a low rate when transmitting transport stream data without dividing it and when dividing packets into two and transmitting the data in ½ packets; and FIG. 5 is a view of an example of modes of transfer at a bus in the case of a high rate when transmitting transport stream data without combining packets and when combining two packets and transmitting the data by double packets.

As shown in FIGS. 4 and 5, since the circuit has the function of transmitting data by dividing or synthesizing packets, the bandwidth of the bus can be effectively used.

An asynchronous communication use packet to be transmitted by the IEEE 1394 serial bus BS is stored in the transmission use FIFO 104a, while an asynchronous communication use packet which has been transmitted by the IEEE 1394 serial bus BS is stored in the reception use FIFO 104b.

The application interface circuit 103 performs the interfacing of transmission and reception of MPEG transport stream data including the clock signal and control signals between the MPEG transporter 40 and the isochronous communication use pre-transmission processing circuit 106 and isochronous communication use post-reception processing circuit 109.

The resolver 105 analyzes the self ID packet transmitted through the IEEE 1394 serial bus BS and stores it in the CFR 111.

Specifically, the isochronous communication use pre-transmission processing circuit 106 receives the MPEG transport stream data of the MPEG transporter 40 via the application interface circuit 103, adjusts the data length in units of quadlets (4 bytes) for isochronous communication of the IEEE 1394 standard, adds 4 bytes of a source packet header (SPH), and stores the result in the FIFO 110.

When adding the source packet header, a time stamp is set for use to suppress Jitter at the time of transmission and for determining the data output time at the reception side in isochronous communication. This is set as follows.

First, the value of the internal cycle register is latched at the time of reception of the final data of the packet from the MPEG transporter 40.

Next, the delay time Txdelay set from the CPU 30 via the host interface circuit 102 into the CFR 111 is added to the value of the above cycle register.

Then, the added value is inserted (set) into the source packet header of the received packet as a time stamp.

FIG. 6 is a view for explaining the concrete configuration of the time stamp.

As shown in FIG. 6, the time stamp for determining the data output time of the reception side indicates the present time with 25 bits.

Namely, the time stamp is comprised of 25 bits. The lower significant 12 bits are allocated as a cycle-offset (CO) region and the upper significant 13 bits are allocated as a cycle-count (CC) region.

The cycle-offset counts 125 μs, that is, 0 to 3071 (12b 101111111111) (clock CLK=24.576 MHZ), while the cycle-count counts one second from 0 to 7999 (13b 1111100111111).

Accordingly, in principle, the lower significant 12 bits of the time stamp never indicate 3072 or more, while the upper significant 13 bits never indicate 8000 or more.

Figure 11:
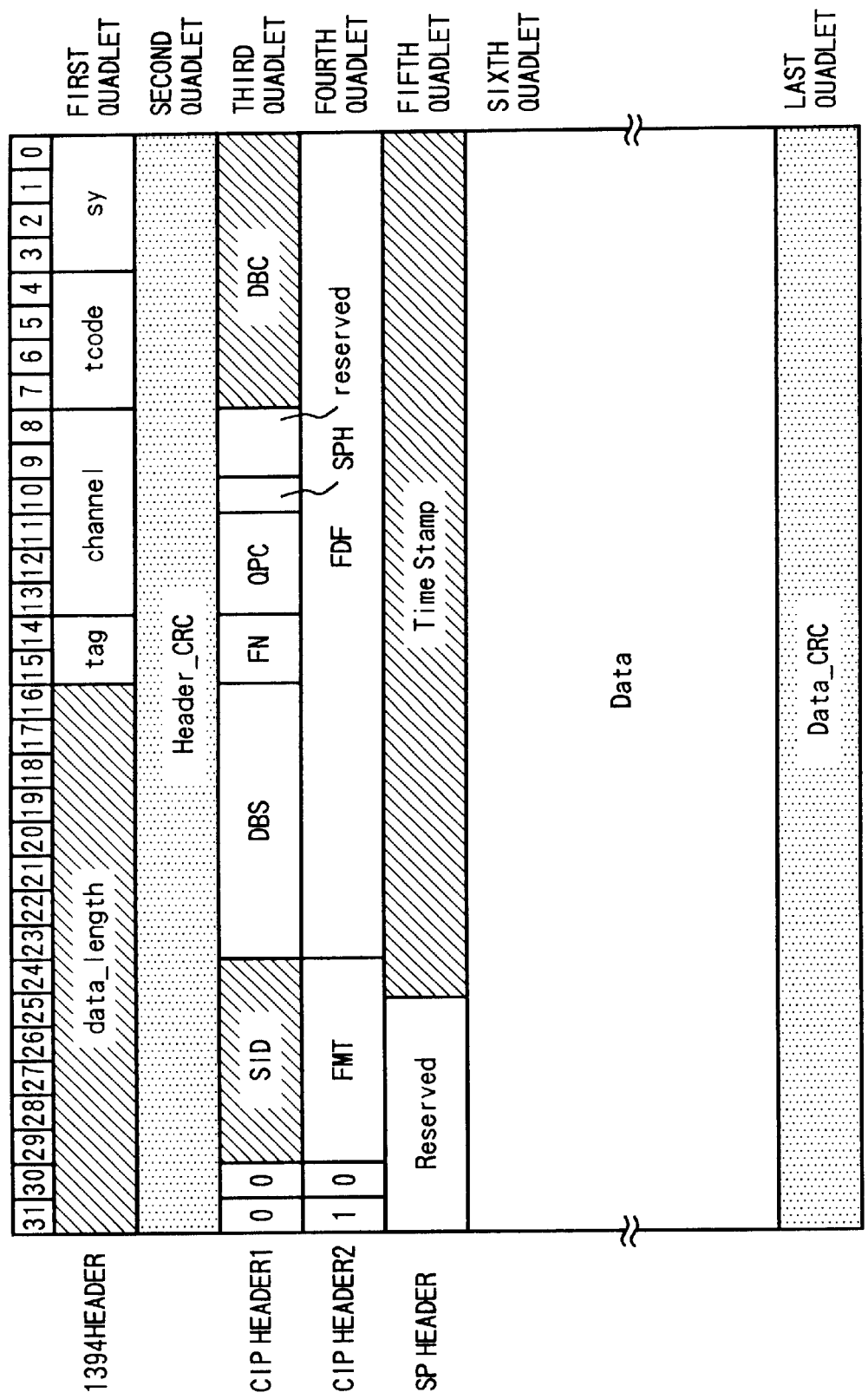
FIG. 11 is a view of an example of the basic configuration of an isochronous communication use packet.
Figure 12:
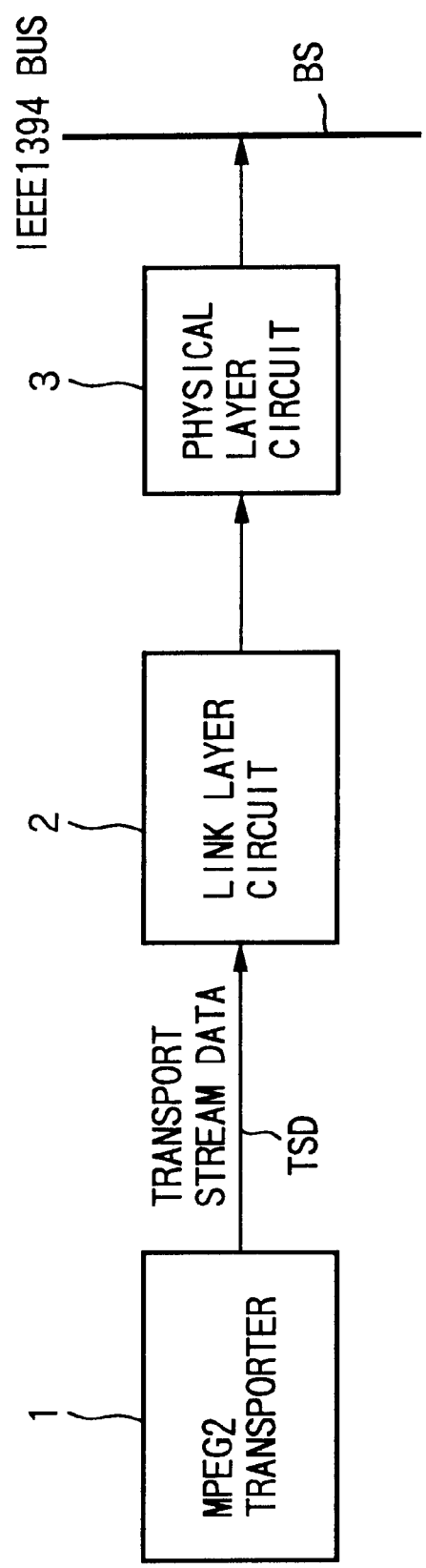
FIG. 12 is a block diagram of the basic configuration of an IEEE 1394 serial interface.
Figure 13:
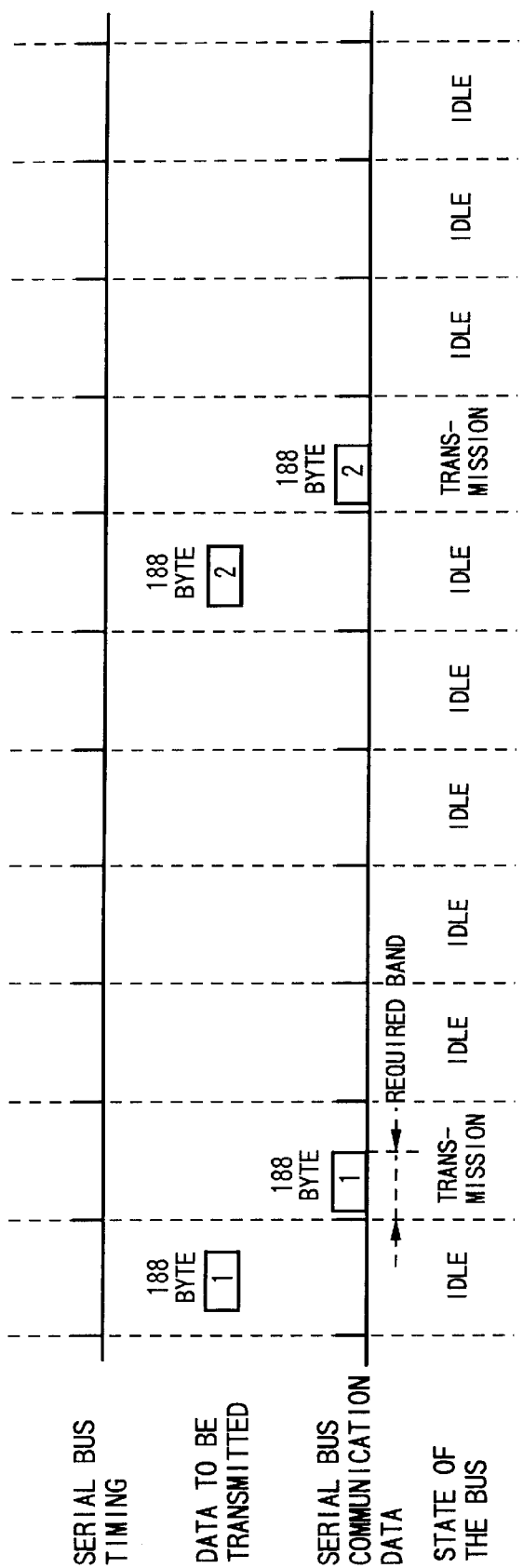
FIG. 13 is a view showing an example of a mode of transfer at a bus in the case of a low rate when transmitting transport stream data without dividing it.

The post-transmission processing circuit 107 adds the 1394 header and CIP headers 1 and 2 to the data including the source packet data stored in the FIFO 110 and outputs the same to the transmission circuit of the link core 101 as shown in FIG. 11.

For example, as shown in FIG. 2 or FIG. 3, the post-transmission processing circuit 107 divides or combines the data stored in the FIFO 110 based on the number of divided blocks set in the NODB register of CFR 111 or the number of synthesized packets set in the NOSP register of CFR 111 in accordance with either of the DVB specification or the DSS specification and outputs the result to the link core 101.

Note that all of the packets stored in the FIFO 110 is combined and transmitted when the packets which can be transmitted are less than the number of synthesized packets.

Specifically for example as shown in FIG. 11, the transmission format adds the 1394 header comprised of a "data length" for indicating data length, a "channel" indicating the number of the channel (one of 0 to 63) over which the packet is to be transferred, a "tcode" indicating the processing code, and a "synchronous code sy" determined in each application; the CIP header 1 comprising a source node ID (SID) region for number of the transmission node, a data block size (DBS) region for the length of the data block, a fraction number (FN) region for the number of divisions of the data in the formation of the packets, a quadlet padding count QPC region for the number of quadlets of the padding data, an SPH region for a flag indicating the existence of the source packet header, and a data block continuity counter (DBC) region for the counter detecting the number of isochronous packets; and the CIP header 2 comprising the FMT region for the signal format indicating the type of data to be transmitted and format dependent field (FDF) region used corresponding to the signal format.

Note that in the above headers, the data block size DBS for the data block length, the fraction number for the number of divisions of the data in the formation of the packets, and one source packet size SPS satisfy the following relation:

$$SPS=DBS \times FN \quad (1)$$

Also, the DBC for the counter detecting the number of the isochronous packets is counted up by 1 every time a data block is transmitted.

The pre-reception processing circuit 108 receives for example an isochronous communication use packet divided and transmitted by the IEEE 1394 serial bus BS via the link core 101, analyzes the contents of the 1394 header, the CIP headers 1 and 2, etc. of the received packet, restores the data, and stores the source packet header and the data in the FIFO 110.

The circuit then performs processing for analysis, for example, by using the values of the DBC, FN, and DBS set in the first quadlet of the CIP header 1 of the divided packet, judges the first packet, judges packet loss when packet loss occurs and interim packets do not arrive, and performs processing for storing the normal packets in the FIFO 110.

The post-reception processing circuit 109 reads the time data of the time stamp in the source packet header stored in the FIFO 110, compares the time stamp data (TS) with the cycle time (CT) of a cycle timer in the link core 101, and outputs the data other than the source packet header stored in the FIFO 110 to the MPEG transporter 40 via the application interface circuit 103 as MPEG use transport stream data when the cycle time CT is larger than the time stamp data TS.

At the time of reading the data from the FIFO 110, for example, when an error bit ERM is set to "1", that is, in the case of outputting a packet set with a DBC discontinuity mark, first the error bit is reset and, for example, one dummy error packet is output. Note that the error packet is a packet not in the FIFO which is inserted in order to indicate that the DBCs are discontinuous.

Note that the next data is read normally from the FIFO 110 since the DBC discontinuity mark is no longer set.

Next, the operation when transmitting an isochronous communication use packet to the IEEE 1394 serial bus BS will be explained.

At the time of transmission, the CPU 30 sets the delay time Txdelay to be added as the time stamp through the host interface circuit 102 into the CFR 111.

Further, the CPU 30 sets the number of divided blocks or the number of synthesized packets, set in accordance with the peak rate of the stream in advance so as to transmit input transport stream packets divided or synthesized in accordance with the input rate as isochronous packets, through the host interface 102 into the CFR 111.

The pre-transmission processing circuit 106 adds the delay time Txdelay set from the CPU 30 via the host interface 102 in the CFR 111 to the value of the internal cycle register at the timing when it receives the final data of the packet from the MPEG transporter 40 and inserts the result into the source packet header of a received packet as the time stamp which determines the output time of the data at the reception side.

The post-transmission processing circuit 107 divides or synthesizes the data stored in the FIFO 110 based on the number of divided blocks set in the NODB register or the number of synthesized packets set in the NOSP register in accordance with either of the DVB specification or the DSS specification set in the CFR 111, adds the 1394 header and the CIP headers 1 and 2 to the data, then outputs the result to the transmission circuit of the link core 101.

The data is then transferred through the link core circuit 101 and the physical layer circuit 20 to the serial interface bus BS in the divided or synthesized or original source packets.

FIG. 7 is a view of an example of the modes of transfer at a bus in the case of dividing data into four and transmitting it by ¼ packets at the time of the DVB specification.

As shown in FIG. 7, since the data is handled divided to ¼, the amount of data transmitted at each transmission becomes smaller and therefore the bandwidth required for communication is reduced.

Further, the bandwidth of the serial bus is used for the data transfer not only when dividing data, but also when transmitting synthesized data, since the average rate of the data transmitted is high.

As explained above, according to the present embodiment, when transmitting a transport stream packet, since the transmission processing circuits 106 and 107 and the link core 101 are provided for dividing or synthesizing the input stream packets based on the number of divided blocks or the number of synthesized packets set in advance in accordance with the input rate, adding a time stamp for suppressing the jitter at the serial interface bus and determining the output time of the data on the reception side, and sending the result to the serial interface bus BS, in the case of a low rate, the amount of data transmitted each time becomes small, the bandwidth required for communication can be reduced, and the bandwidth of the serial bus BS can be used efficiently.

Further, the bandwidth of the serial bus is used for the data transfer not only when dividing data, but also when transmitting synthesized data, since the average rate of the data transmitted is high.

As explained above, according to the present invention, the bandwidth of the serial bus can be used efficiently regardless of the rate being high or low.

While the invention has been described with reference to a specific embodiment chosen for purpose of illustration, it should be apparent that numerous modifications could be made thereto by those skilled in the art without departing from the basic concept and scope of the invention.

What is claimed is:

1. A signal processing circuit for performing transmission between its own node and another node connected to its own node via a serial interface bus, comprising:

a data processing circuit for dividing an input stream packet based on a predetermined number of divided blocks set in accordance with an input rate for output.

2. A signal processing circuit as set forth in claim 1, wherein the number of divided blocks is set in response to a peak rate of the stream.

3. A signal processing circuit as set forth in claim 1, wherein the stream packet is divided for transfer when a rate thereof is less than a reference rate.

4. A signal processing circuit as set forth in claim 1, further comprising:

a means for adding a time stamp for suppressing jitter at the serial interface bus and determining:

a data output time at the reception side to a transmitted packet.

5. A signal processing circuit for performing transmission between its own node and another node connected to its own node via a serial interface bus, comprising:

a data processing circuit for combining input stream packets based on a predetermined number of synthesized packets set in accordancw with an input rate for output.

6. A signal processing circuit as set forth in claim 5, wherein the number of synthesized packets is set in accordance with a peak rate of the stream.

7. A signal processing circuit as set forth in claim 5, wherein stream packets are combined for transfer when a rate thereof is higher than a reference rate.

8. A signal processing circuit as set forth in claim 5, further comprising:

a means for adding a time stamp for suppressing jitter at the serial interface bus and determining a data output time at the reception side to a transmitted packet.

9. A signal processing circuit for performing transmission between its own node and another node connected to its own node via a serial interface bus, comprising:

a data processing circuit for dividing or synthesizing an input stream packet based on a predetermined number of divided blocks or number of synthesized packets set in accordance with an input rate for output.

10. A signal processing circuit as set forth in claim 9, wherein the number of divided blocks or number of synthesized packets is set in accordance with a peak rate of the stream.

11. A signal processing circuit as set forth in claim 9, wherein the stream packet is divided for transfer when a rate thereof is less than a reference rate or is synthesized for transfer when a rate thereof is higher than a reference rate.

12. A signal processing circuit as set forth in claim 9, further comprising:

a means for adding a time stamp for suppressing jitter at the serial interface bus and determining a data output time at the reception side to a transmitted packet.

* * * * *

UNITED STATES PATENT AND TRADEMARK OFFICE
CERTIFICATE OF CORRECTION

PATENT NO.    : 6,408,012 B1
DATED         : June 18, 2002
INVENTOR(S)   : Sadaharu Sato It is certified that error appears in the above-identified patent and that said Letters Patent is hereby corrected as shown below:

Column 1,
Line 59, "specificatoin" should read -- specification --.

Column 3,
Line 22, "accordancw" should read -- accordance --.

Column 4,
Line 62, "costituted" should read -- constituted --.

Column 9,
Line 29, "accordancw" should read -- accordance --.

Signed and Sealed this

Twenty-ninth Day of April, 2003

JAMES E. ROGAN
*Director of the United States Patent and Trademark Office*